United States Patent Office 3,245,995
Patented Apr. 12, 1966

3,245,995
BIS-(6-OXO-6H-ANTHRA-[9,1-cd]-ISOTHIAZOLE-3-CARBOXAMIDE) DERIVATIVES
Walter Robert Demler, Hamburg, N.Y., assignor to Allied Chemical Corporation, New York, N.Y., a corporation of New York
No Drawing. Filed Mar. 9, 1964, Ser. No. 350,577
10 Claims. (Cl. 260—272)

The present invention relates to novel N,N'-derivatives of bis - (6-oxo-6H-anthra-[9,1-cd]-isothiazole-3-carboxamide) and to the preparation thereof. These compounds have the general formula:

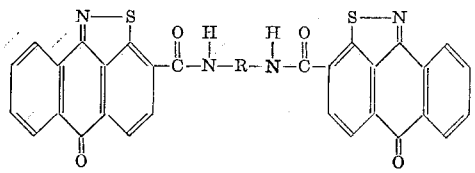

wherein R is an organic radical containing at least two carbon atoms and being free of water solubilizing groups, i.e. groups that induce solubility in water.

Compounds of the above formula are valuable yellow pigments characterized by brightness of shade and excellent fastness to light.

My novel compounds can be obtained by reacting two molecular proportions of 6-oxo-6H-anthra-[9,1-cd]-isothiazole-3-carboxylic acid halide, preferably chloride or bromide with one molecular proportion of a diamine having the general formula $$H_2N—R—NH_2$$

wherein R has the above described meaning.

The reaction is preferably carried out in the presence of an inert solvent such as nitrobenzene o-dichlorobenzene, trichlorobenzene, and the like.

An acid binding agent, such as sodium or potassium hydroxide or carbonate, pyridine, picoline, collidine, and the like can be used if desired.

The reaction proceeds at a convenient rate at elevated temperatures, e.g., above 100° and preferably between 150° and 200° C., being essentially complete after a period of from about 5 to 30 hours depending on the temperature.

The novel products can generally be isolated from the reaction mixture by cooling the mass to below about 100° C. and then filtering the insoluble product. This can be purified by washing on the filter or by reslurrying in an organic liquid, conveniently the solvent used in the reaction, and thereafter removal of the organic liquid by washing the filtered product with a low molecular weight aliphatic alcohol, e.g. methanol, ethanol, isopropanol, etc. The washed cake can, if desired, be washed with hot or cold water and dried in any convenient manner.

The diamine component, $H_2N—R—NH_2$, used in the preparation of my novel compounds can be selected from a wide variety of organic diamines. Accordingly, they may be aliphatic, cycloaliphatic, aromatic, araliphatic, and heterocyclic diamines. As examples of this broad class of reactants, the following are typical:

Ethylenediamine
1,2-propanediamine
1,3-propanediamine
1,4-butanediamine
2,4-hexanediamine
1,3-cyclohexanediamine
1,4-cyclohexanediamine
4,4'-methylenebiscyclohexylamine
m-Phenylenediamine
p-Phenylenediamine
m-Xylene-α,α'-diamine
2,3,5,6-tetrachloro-α,α'-p-xylenediamine
Benzidine
3,3'-dichlorobenzidine
Dianisidine
4,4'-methylenedianiline
2,6-diaminopyridine
3,5-diaminopyridine
2,5-bis(p-aminophenyl)-1,3,4-oxadiazole
2,5-bis(m-aminophenyl)-1,3,4-oxadiazole
2,5-bis(o-aminophenyl)-1,3,4-oxadiazole The above compounds are also exemplary illustrations for the types of radicals represented by R in the novel compounds of the invention.

Broadly speaking, my invention contemplates the use of any organic diamine containing only two primary amino groups separated from each other by at least two carbon atoms and which contains no other moiety which reacts with either the carbonyl halide group of the anthraisothiazole or the amino group of the diamine. Said diamine also is free of groups inducing solubility in water. The novel products of my invention are not in general suitable for use as vat dyestuffs since their leuco derivatives are quite insoluble in the "vat," which is the alkaline hydrosulfite reduction medium. In order to convert the compounds of the invention into a state wherein they are suitable for use as pigments, it is necessary to "condition" them in accordance with techniques well known in the pigment art. For example the novel products as obtained from the reaction of the acyl halide and diamine can be dissolved in concentrated sulfuric acid and the solution is poured into hot or cold water, usually while the water is agitated. This conditioning treatment which is also called "acid-pasting," is subject to many variations which are all well known to those skilled in the art.

The conditioning can also be accomplished by other well known procedures such as sand grinding, salt grinding, micropulverizing and the like. The herein useful so-called "dry-conditioning" methods are also well known in the pigment art. In short, any means for comminuting the products as obtained from the reaction described above to a state of fineness necessary for most if not all pigment applications can be used.

The novel products of my invention are useful as pigments for coloring natural or synthetic materials, such as resins, coating compositions, synthetic fibers by spin-dyeing techniques, or for coloring of paper pulp and the like, or as colors in the printing of textiles by processes such as the known pigment-resin emulsification ("Aridye") process. These products are of especial value due to their brilliance, purity and fastness characteristics as pigments in coating compositions.

The following examples set forth the best mode contemplated in carrying out the present invention, but it is to be understood that the invention is not limited to all details of the examples. Parts and percentages are by weight and temperatures are given in degrees centigrade.

Example 1

A mixture of 30 parts of 6-oxo-6H-anthra-[9,1-cd]-isothiazolyl-3-carbonyl chloride, 3.7 parts of a 95 percent pure 1,2-propanediamine, and about 300 parts of nitrobenzene is heated to and maintained at 165° to 170° for about 20 hours. The mass is heated at 200° for ½ hour and thereafter cooled to 90°. The resulting slurry is filtered. The filter cake is washed first with nitrobenzene and then with ethanol denatured by 2% benzene. The washed cake is dried. The dried greenish yellow product is N,N' - propylenebis(6-oxo-6H-anthra-[9,1-cd]-isothiazole-3-carboxamide) having the formula:

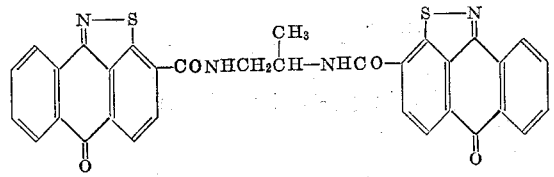

Example 2

The procedure of Example 1 was repeated using an equivalent amount of 2,5-bis(p-aminophenyl)-1,3,4-oxadiazole, instead of 1,2-propanediamine. The resulting yellow pigment N,N' - [1,3,4 - oxadiazole-2,5-diyldi-(p-phenylene)] - bis(6-oxo-6H-anthra-[9,1-cd]-isothiazole-3-carboxamide) has the formula

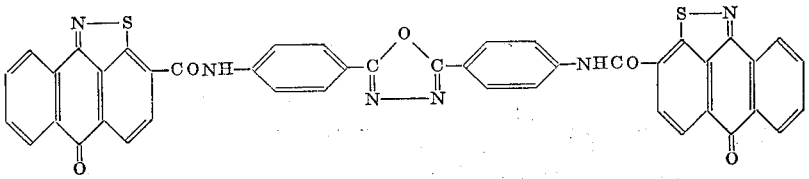

Example 3

In a similar fashion to that described in Example 1, except that a molecular equivalent amount of m-xylene-α,α'-diamine was used in place of 1,2-propylene diamine, the yellow pigment, N,N'-m-phenylenedimethylene bis-(6-oxo-6H-anthra-[9,1 - cd]-isothiazole-3-carboxamide) was prepared, having the formula

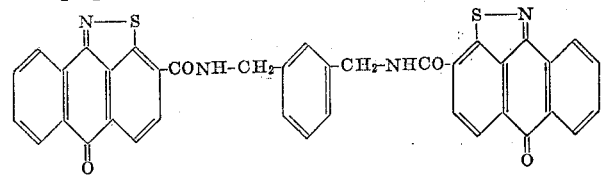

Examples 4–10

The following table lists several additional pigments prepared substantially as described in Example 1. The particular diamines used to obtain the novel compounds of the respective examples are also indicated.

| Ex. No. | Diamine | Pigment | Shade |
|---|---|---|---|
| 4 | 1,3-propanediamine | N,N'-trimethylenebis-(6-oxo-6H-anthra-[9,1-cd]-isothiazole-3-carboxamide | Yellow. |
| 5 | Ethylenediamine | N,N'-ethylenebis-(6-oxo-6H-anthra-[9,1-cd]-isothiazole-3-carboxamide) | Yellow. |
| 6 | 2,3,5,6-tetrachloro-α,α'-p-xylenediamine. | N,N'-2,3,5,6-tetrachloro-p-xylenebis-(6-oxo-6H-anthra-[9,1-cd]-isothiazole-3-carboxamide) | Greenish Yellow. |
| 7 | 4,4'-methylenedianiline | N,N'-4,4'-methylenediphenylbis-(6-oxo-6H-anthra-[9,1-cd]-isothiazole-3-carboxamide) | Greenish Yellow. |

| Ex. No. | Diamine | Pigment | Shade |
|---|---|---|---|
| 8 | 4,4'-methylenebiscyclo-hexylamine. | 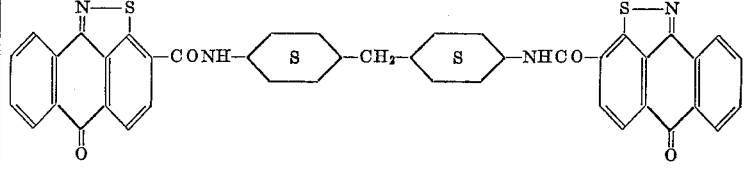 N,N'-4,4'-methylenedicylohexylbis-(6-oxo-6H-anthra-[9,1-cd]-isothiazole-3-carboxamide) | Yellow. |
| 9 | 2,6-diaminopyridine | 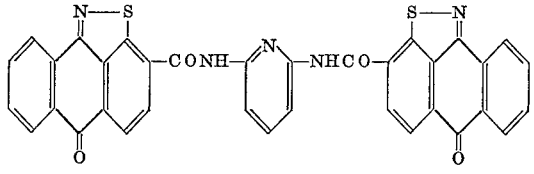 N-2,N-6-pyridinediylbis-(6-oxo-6H-anthra-[9,1-cd]-isothiazole-3-carboxamide) | Reddish Yellow. |
| 10 | 3,3'-dichlorobenzidine | 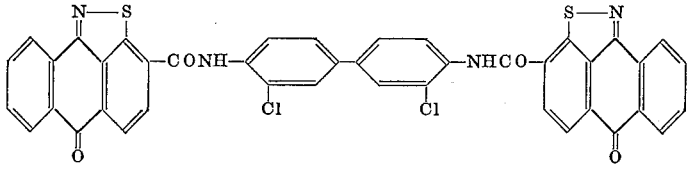 3,3'-dichloro-4,4'-biphenylenebis-(6-oxo-6H-anthra-[9,1-cd]-isothiazole-3-carboxamide) | Greenish Yellow. |

*Example II*

A mixture of 40 parts of the yellow product of Example 2, 940 parts of 40 mesh nominal Ottawa sand and 250 parts of water was milled in a rotating mill for about 48 hours. The mixture was passed through an 80 mesh screen, which retained the sand while permitting the slurry of the yellow pigment to pass through. The retained sand was washed free of color with water which was added to the filtrate. The color slurry was heated to and maintained boiling for 1 hour and then filtered. The filter cake was washed acid-and chloride ion-free with water. The washed cake then was dried at 60°.

The conditioned pigment was examined for mass color according to ASTM Standard D–387–60 using Procedure B, Hoover muller. The lemon-yellow pigment gives excellent masstones and a light fastness rating of more than 120 hours when exposed in the Fade-Ometer in accordance with ASA Standard L–14.53–1961. The pigment also shows practically no bleed in the usual organic paint solvents.

I claim:
1. A compound of the formula

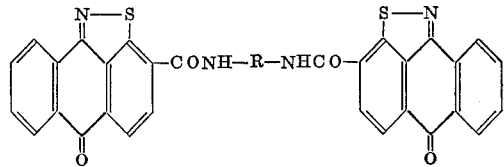

wherein R is an organic radical of the following group: 1,2-propylene; 1,4-butylene; 2,4-hexylene; 1,3-cyclohexylene; 1,4-cyclohexylene; m-phenylene; p-phenylene; 4,4'-biphenylene; 3,3'-dimethoxy-4,4'-biphenylene; N-3, N-5-pyridinediyl; 1,3,4-oxadiazo-2,5-diyldi-(o-phenylene); and 1,3,4-oxadiazo-2,5-diyldi-(m-phenylene).

2. N,N' - propylene bis-(6-oxo-6H-anthra-[9,1-cd]-isothiazole-3-carboxamide).

3. N,N'-1,3,4-oxadiazole - 2,5-diyldi-(p-phenylene)-bis-(6-oxo-6H-anthra-[9,1-cd]-isothiazole-3-carboxamide).

4. N,N' - m - phenylenedimethylene bis - (6 - oxo - 6H-anthra-[9,1-cd]-isothiazole-3-carboxamide).

5. N,N'-1,3 - trimethylene bis - (6-oxo-6H-anthra-[9,1-cd]-isothiazole-3-carboxamide).

6. N,N' - ethylene bis - (6-oxo-6H-anthra-[9,1-cd]-isothiazole-3-carboxamide).

7. N,N'-2,3,5,6 - tetrachloro-p-xylene bis - (6-oxo-6H-anthra-[9,1-cd]-isothiazole-3-carboxamide).

8. N,N'-4,4'-methylene diphenyl bis-(6-oxo-6H-anthra-[9,1-cd]-isothiazole-3-carboxamide).

9. N,N' - 4,4' - methylenedicyclohexyl bis - (6-oxo-6H-anthra-[9,1-cd]-isothiazole-3-carboxamide).

10. N-2,N - 6 - pyridinediyl bis-(6-oxo-6H-anthra-[9,1-cd]-isothiazole-3-carboxamide).

References Cited by the Examiner

Noller: Chemistry of Organic Compounds, Saunders (1957), 2nd ed., pp. 161, 237, 479.

Wagner-Zook: Synthetic Organic Chemistry, Wiley (1953), pp. 566–567.

WALTER A. MODANCE, *Primary Examiner.*

A. L. ROTMAN, *Assistant Examiner.*